Figure 1:
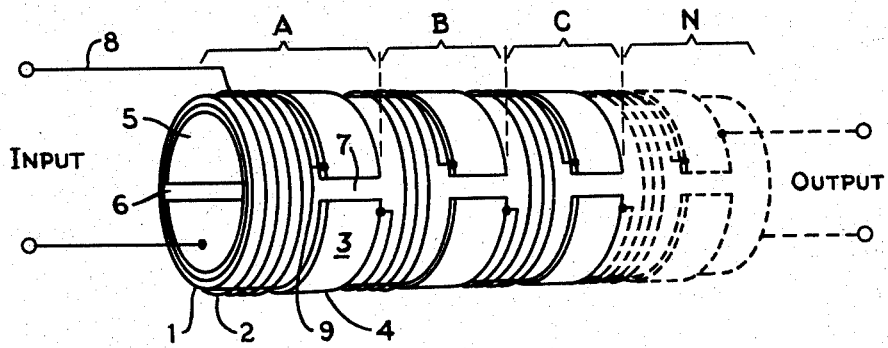

July 7, 1959  C. E. COY  2,894,221

ARTIFICIAL TRANSMISSION LINES

Filed Oct. 11, 1955

INVENTOR.
CARL E. COY

BY

ATTYS.

United States Patent Office 2,894,221
Patented July 7, 1959

2,894,221

ARTIFICIAL TRANSMISSION LINES

Carl E. Coy, Glen Burnie, Md.

Application October 11, 1955, Serial No. 539,953

2 Claims. (Cl. 333—29)

(Granted under Title 35, U.S. Code (1952), sec. 266)

The invention described herein may be manufactured and used by or for the Government of the United States of America for governmental purposes without the payment of any royalties thereon or therefor.

In accordance with this invention, a lumped-constant artificial transmission line comprises a hollow winding form made of a dielectric material, a plurality of inductance windings spaced at intervals on the form, and a plurality of capacitor elements disposed between the windings and utilizing the form itself as their respective dielectrics. Each of the capacitor elements comprises a layer of current-conductive material disposed between the windings on the outer surface of the form, a layer of conductive material on the inner surface of the form, and a dielectric composed of the substance of the form itself. The conductive material on the outer surface in each of the spaces between the windings constitutes both a capacitor plate and a conductive link interconnecting the windings in series, and the conductive material on the inner surface of the form necessarily has part of its area directly opposite the spaced materials on the outer surface such that it constitutes a capacitor plate common to each of the capacitor elements. The input lead of the series-connected inductance windings normally will receive the signal while the common capacitor plate will be connected to ground or to a source of constant potential. To minimize the signal attenuation attributable to the effects of counter-inductive fields produced by currents induced in the conductive materials comprising the capacitor elements, the material may be made discontinuous, or suitable insulating material may be inlaid therein to sever the paths along which induced currents normally flow.

In general, artificial transmission lines embody, within a structure of short length and convenient cubic dimensions, electrical characteristics equivalent to those of transmission lines which may be, for example, many miles in length. This enormous conservation of space is made possible by interconnecting inductance, capacitance, and resistance elements of suitable size in a way which will make the combination respond to signals having frequencies within a desired range in the same manner as a given natural transmission line. The impedance elements used in the artificial line may be "lumped" or "distributed." In the former construction, each structural element of the line is primarily inductive, capacitive, or resistive; in the latter, a given structural element such as a winding for example, may be operative both as an inductive element and, in part, as a capacitive element wherein the capacitance is distributed between the insulated turns of the winding, or between the winding as one capacitor plate and another plate separated therefrom by a suitable dielectric material. Inasmuch as the subject matter of the invention pertains to artificial lines of the lumped constant type, no further consideration will be given to those having distributed parameters. It should be noticed, however, that lines of the lumped constant and distributed parameter types, having windings to provide their inductive reactances, usually are referred to as lines of the "electromagnetic" type.

It is well known among practitioners in the art that artificial transmission lines have many applications in electrical apparatus. For example, they may be used to match impedances, terminate transmission lines in their characteristic impedance, and to delay signals.

Where artificial lines are designed primarily for signal delay applications, they are called "delay lines." As suggested by the nomenclature applied to artificial transmission lines, delay lines also may be designated as electromagnetic lines of the lumped constant or distributed parameter type. For convenience, this invention is disclosed in a delay line environment.

A lumped-constant delay line is composed, essentially, of one or more low-pass filter sections connected in series. Each section includes separate elements of inductive and capacitive reactance. It should be apparent, therefore, that delay lines of many desired characteristics may be designed merely by applying conventional low-pass filter theory. Such lines are useful in applications where low impedance, high voltage, low time delay-temperature coefficient, low signal attenuation (because of comparatively low dielectric losses), or short physical length are important considerations. For example, these applications may be found in waveform synchronizers, marker signal generators, rectangular pulse generators, coders, decoders, angular modulators, and many other forms of electrical apparatus.

Inasmuch as the theory and more detailed electrical design considerations for lumped-constant delay lines is conventional, it will be sufficient merely to state that the delay-in-transit time for transmitted signals varies directly with the square root of the product of the inductance and capacitance of the line. Therefore, to maintain a given time delay when signals of constant power but lower frequency are to be passed, the inductive or capacitive reactance or both must be increased. Ordinarily, an increase in either of these factors involves a corresponding increase in the size of their physical embodiments. Increases in the size of the components of electronic circuits is abhorred by contemporary designers for reasons which are set forth below. Indeed, one of the principal considerations in designing apparatus for portability, and especially for use in aircraft, is the minimization of size and weight.

The advantages to be effected by miniaturizing and reducing the weight of electronic apparatus to be used in aircraft have been recognized in the industry since the advent of such apparatus and the development of practical design considerations. Vast sums of money have been spent by government and private industrial organizations on the problem of weight reduction and more efficient and effective space utilization. In accordance with continuing efforts to reduce this problem still further, designers of electronic apparatus for commercial and military aircraft have been quick to adopt the low-power, diminutive circuitry and functional components made available through developments in printed circuit techniques and semi-conductors.

As electronic apparatus becomes more and more miniaturized through the incorporation of printed circuits and semi-conductors, it becomes apparent that, in comparison, the electromagnetic components of such apparatus become disproportionately large.

Accordingly, the principal objects of this invention are:

(1) To provide a unitary structural organization for the components of a lumped-constant electromagnetic artificial line having a size and weight far smaller than that of lines with similar electrical characteristics and previously known construction, (2) To provide a lumped-constant artificial line of the electromagnetic type structurally organized for minimum weight and size for a given set of electrical characteristics, (3) To provide a lumped-constant artificial line of the electromagnetic type wherein the material of the winding form constitutes the dielectric for the capacitor elements, (4) To provide an electromagnetic lumped-constant artificial line which eliminates the need for structural appendages such as separate, space-consuming capacitors and their associated mechanical supporting and fastening means, and (5) To provide a lumped-constant artificial delay line having a single unitary structure wherein size and weight may be twenty times less than the size and weight of lines with the same electrical characteristics constructed in accordance with previously known principles, and wherein the capacitive elements are made integral with the winding form such that the need for appendages, mechanical supports, fasteners, or terminals associated with the lumped constant components is eliminated.

Figure 2:
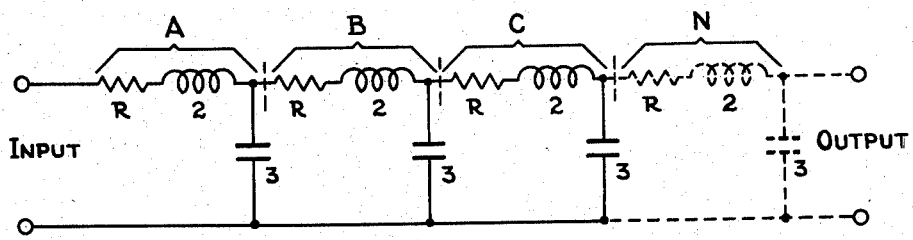

The foregoing summary of the invention, discussion of the problem evoking its origination, and statement of its objects are intended merely to facilitate the development of an understanding and appreciation of its qualitative features, not to restrict its scope. It is probable that additional objects and features of the invention will become apparent after reference to the following detailed description made in conjunction with the accompanying drawings wherein:

Figure 1 represents the physical structure of a preferred embodiment of the artificial line, and Figure 2 represents schematically the usual combination of electrical components comprising a lumped-constant artificial transmission line.

The preferred embodiment of the lumped-constant delay line, Figure 1, is comprised of a hollow cylindrical winding form 1 made of a ceramic material such as steatite, porcelain, or any other substance having suitable dielectric properties, and one or more low-pass filter sections, A, B, C, N . . . , mounted thereon. The low-pass filter sections are similar and each is comprised of an inductance winding 2 and a capacitor 3. The inductance winding 2 of each section is conventional and may be made up of an appropriate number of turns of an insulated conductor of appropriate size wound around the core in such a manner as to be self-supporting thereon and to provide the required amount of inductive reactance within the range of signal frequencies for which the line is designed.

The capacitor 3 of each of the low-pass filters, A, B, C, N . . . , is composed of a plate 4 disposed on the outer surface of the form 1, a plate 5 disposed on the inside surface of the form directly opposite to the plate 4, and a dielectric medium composed of the material of the form itself. The plate 5 of the capacitor may be disposed over the entire inner surface of the form and, as such, it will be common to the capacitor of each of the filter sections. The capacitor plates, 4 and 5, are slotted as shown at 6 and 7 to sever the path through which induced currents normally flow and minimize thereby signal attenuation attributable to counter inductive fields which such currents would produce.

The plate elements, 4 and 5, of the capacitors may be composed of highly conductive metal paints, such as silver, gold, copper, et cetera, fired onto the surface. Alternatively, the plates may be comprised of conductive materials such as metal foils held in place on the surface by suitable glutinous or other binding substances; or the plates may be composed of a conductive elastic material such as one of the brass alloys so formed that their respective reflexive tensions will hold them firmly in place on the winding form 1.

As represented in Figure 1, a lead 8 of inductor 2 may be connected to a signal source (not shown) to receive the signal to be delayed. The other lead 9 of inductor 2 is connected to plate 4 of the capacitor 3. This connection may be made mechanically, by soldering, welding, or by any other appropriate method.

If a plurality of low-pass filter sections are to be used, the leads of their respective inductor windings and the outer plates of their respective capacitors will be connected in series as illustrated in Figure 1, which shows the input leads of the inductors of sections, A, B, C, N . . . , connected to the outer plate of the capacitor of the preceding section. The output of the line may be taken across leads attached respectively to the outer plate of the capacitor of the last section N and to the common inner plate 5 of the line. The letter N used to designate the last section of the line is intended to signify that the line may comprise an indefinite number of low-pass filter sections.

The electrical schematic diagram, Figure 2 is included merely to represent the interrelationship of the lumped components of an artificial delay line constructed in accordance with this invention. The reference numerals used to designate the various elements of Figure 2 correspond with those of Figure 1. Inasmuch as the interrelationship of the electrical components represented in Figure 2 is conventional, the theory of operation of and electrical design considerations for constructing a line in accordance with the invention also will be conventional and, accordingly, will not be set forth herein.

Although the preferred embodiment of the invention has been described herein principally in the environment of signal delay lines, it should be understood that its inherent principles make it equally applicable to all artificial transmission lines of the lumped-constant electromagnetic type. The signal delay line environment was selected merely to facilitate disclosure.

Furthermore, the configuration of the form 1 may be varied, within limits established by the electrical requirements, to conform to the space in which the line is to be mounted. Channels may be provided in the form to receive the windings and the capacitor plates may be provided as desired. Moreover, the inductor windings themselves may be produced in accordance with conventional printed circuit techniques, and the form itself may be composed of plastic, glass, or any material having the requisite dielectric properties. Instead of mounting a multiplicity of filter sections on a single form, a separate form may be provided for each section and the individual sections then could be interconnected electrically. Such an elemental construction would provide added flexibility for installing the line in tortuous spaces.

It is understood that this invention is not limited to the details of construction illustrated in the accompanying drawings and the foregoing description; the scope of the invention is represented in the following claims.

What is claimed is:

1. An artificial, lumped-constant, electromagnetic signal delay line comprising, a single hollow cylindrical winding form of dielectric material and having substantially uniform cross section, a plurality of spaced inductance windings each comprised of a plurality of turns of electrical conductor circumferentially wound on said cylindrical winding form, a first plate of current conductive material disposed on the internal periphery of said winding form substantially the entire length thereof, a plurality of second plates of current conductive material shorter in length than said first plate disposed on the outer periphery of said cylindrical form, the number of second plates being equal in number to the number of said inductance windings with a second plate being adjacent to each of said inductance windings, and means for connecting the ends of said inductance windings to adjacent second plates thereby providing a plurality of low-pass, series connected filter sections.

2. An artificial, lumped-constant, electromagnetic signal delay line as set forth in claim 1 wherein said first plate and each of said second plates have a longitudinal slot therein to localize the flow of currents induced in the said plates by said inductance windings.

References Cited in the file of this patent

UNITED STATES PATENTS

| | | |
|---|---|---|
| 2,416,297 | Finch et al. | Feb. 25, 1947 |
| 2,727,213 | Lucas | Dec. 13, 1955 |